Dec. 4, 1923.
D. J. BOATSMAN
VEHICLE BRAKE
Filed Sept. 13, 1921
1,476,439
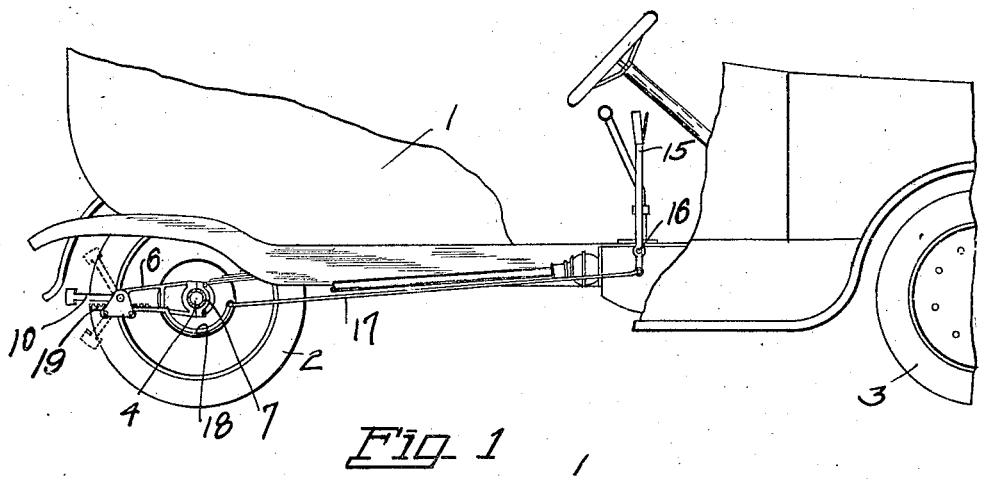
Fig. 1
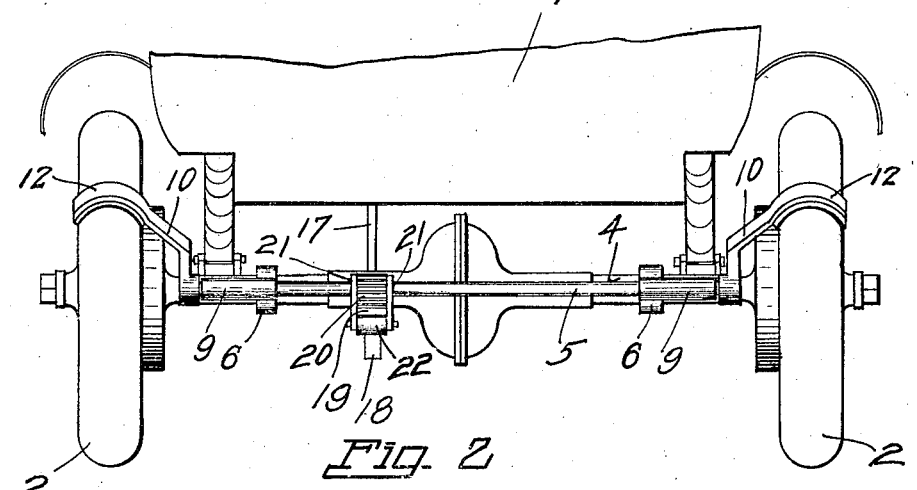
Fig. 2
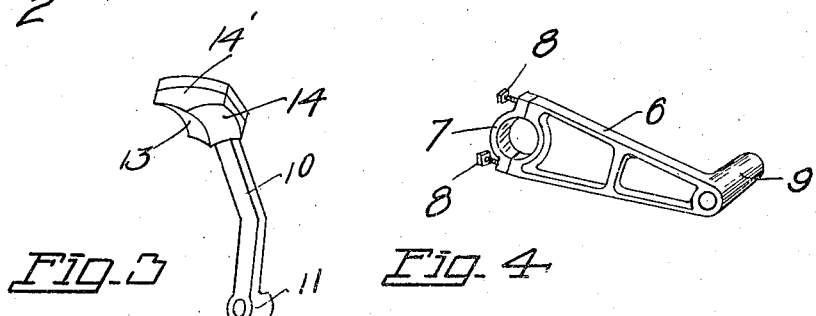
Fig. 3
Fig. 4
Inventor
Deark J. Boatsman.
Herbert E. Smith
Attorney Patented Dec. 4, 1923.

1,476,439

UNITED STATES PATENT OFFICE.

DEARK J. BOATSMAN, OF ELK, WASHINGTON, ASSIGNOR OF TWENTY-FOUR ONE-HUN-DREDTHS TO CARL E. BOATSMAN AND TWENTY-FIVE ONE-HUNDREDTHS TO RICH-ARD A. BURCH, BOTH OF ELK, WASHINGTON.

VEHICLE BRAKE.

Application filed September 13, 1921. Serial No. 500,317.

*To all whom it may concern:*

Be it known that I, DEARK J. BOATSMAN, a citizen of the United States, residing at Elk, in the county of Spokane and State of Washington, have invented certain new and useful Improvements in Vehicle Brakes, of which the following is a specification.

My present invention relates to improvements in vehicle brakes especially designed for use in connection with the rear wheels of automobiles for frictionally engaging the rims of the wheels to retard the movement of the vehicle, and also applicable for use against retrograde movement of the vehicle, in either forward or backward direction, when the automobile is standing on a hill or incline.

The primary object of the invention is the provision of a device of this character that is comparatively inexpensive in cost of production, is simple both in construction and operation, may readily be assembled and attached for use with facility to an automobile, and which is efficient not only in retarding the movement of the car to which it is applied, but also in retaining the standing vehicle in stationary position.

With the above ends in view the invention consists in certain novel combinations and arrangements of parts involving reversible brake devices and their operative connections as will be hereinafter more fully described and claimed.

In the accompanying drawings I have illustrated one complete example of the physical embodiment of my invention in which the parts are combined and arranged according to the best mode I have thus far devised for the practical application of the principles of my invention.

Figure 1 is a view in side elevation, with parts omitted, of so much of an automobile as is necessary for illustration therewith of the device of my invention.

Figure 2 is a rear view of the vehicle of Figure 1 showing the adaptation thereto of my invention, the brake shoes being shown in position to retard forward movement of the car, or to retain the car in stationary position on an incline.

Figure 3 is a perspective view of one of the brake arms showing the head with friction faces thereon for application to the wheel in reverse directions.

Figure 4 is a perspective view of one of the brake-shaft supporting-brackets.

In the preferred form of the invention as illustrated in the drawings I have utilized a standard form of automobile with its body designated as 1, the rear wheels as 2 and the front wheels as 3, while the rear axle 4 is also of usual or accepted type.

The brake equipment of my invention may be manufactured as a part of the original automobile or other vehicle, or may be applied to existing cars, and in either event I utilize a brake shaft 5 extending transversely of the vehicle at the rear of and parallel with the rear axle, and supported from said axle by means of a pair of spaced brackets 6 that are fashioned of metal and light and strong as required. These brackets extend horizontally from the rear axle and are rigidly fixed thereto by means of detachable bracket heads 7 that are curved complementarily to the ends of the brackets to form circular openings to fit around the rear axle, and by means of bolts 8 in the heads and brackets, the latter are held in adjusted position.

Each of the brackets is provided with a bearing sleeve 9 disposed at right angles to the bracket and within these sleeves the ends of the brake shaft are journaled in order that said shaft may be rocked or oscillated in its bearings.

At the ends of the shaft, which protrude through the outer ends of the bearing sleeves, are affixed brake arms 10, 10, each having a bushing 11 integral therewith and the bushing is secured in suitable manner on the brake shaft in order that the shaft and arms may be oscillated as one element. The brake arms are bent and project laterally of the automobile, as seen in Figure 2, to bring their heads 12 into position with relation to the wheels 2, 2, whereby the oppositely disposed friction surfaces 13 and 14 of the shoe 14′ may at different times be brought into contact with the tread of the wheels. These shoes are preferably made of rubber or similar material for contact with the wheel tires and the friction surfaces 13 and 14 are disposed at the proper angle to make frictional contact over their entire areas when applied to the wheel tires.

The brake is applied from the driver's seat by the driver who manipulates the lever 15 located in convenient position for access thereto, and the operating lever which is pivoted at 16 is pivotally connected to a rearwardly extending rod 17, which in turn is pivotally connected to a slide bar 18, bent or curved to pass under the axle 4 as shown. At its free end and on its upper face this slide bar has rack teeth 19 to engage the rack wheel 20 formed on the brake shaft 5, and a pair of shackles 21 are loosely supported on the shaft 5 to encase and guide the rack bar or slide bar and hold the latter in engagement with the rack wheel. Antifriction rollers 22 are also provided in the shackles, beneath the rack bar, in order that the latter may slide freely through the shackles as a support and be held in engagement with the rack wheel.

In Figure 1 the operating lever is in neutral position i. e. vertical or upright, and the brake arms and shoes are in inoperative position, as shown in full lines, extending in horizontal position. Now by pushing the lever 15 to forward position, the brake shaft is rocked, and the brake arms are swung upwardly to dotted position, causing the surfaces 13 of the shoes to engage the wheel tire and retard forward movement of the car. Or if the car is stationary the application of the brakes to this position will hold the wheels against revolution and the car may thus be held against downhill movement.

By pulling the lever 15 to the rear in Figure 1, the brake shaft is revolved or rocked, and consequently the brake arms are swung downwardly to dotted position by which movement the friction surfaces 14 of the brake shoes are applied to the respective wheel tires to retard rear movement of the moving vehicle, or if the vehicle is to be stopped on a hill declining rearwardly, the application of the brakes below the axle, as indicated will prevent retrograde movement of the automobile. When applying the brakes to a moving vehicle the friction between the shoes and tire may be gradually increased by increased pressure on the lever, and after pressure has been applied, it will be apparent that the effectiveness of the friction shoes will be increased until the momentum of the vehicle is overcome.

While the car is standing on a downgrade with the brakes applied in either position, it will be apparent that the tendency of the vehicle to move under action of gravity will more effectively increase the friction of the shoes and restrain movement of the car.

Having thus fully described my invention, what I claim and desire to secure by Letters Patent is—

1. The combination with a rear axle of a vehicle and supporting brackets thereon, of a transversely arranged brake shaft journaled in said brackets and a pinion thereon, a rack bar for oscillating said pinion and shaft and operating means for the bar, brake arms on the ends of said shaft disposed normally in the horizontal plane of the axle and shoes on said arms to engage the vehicle wheels, whereby the shoes may be applied either above or below the plane of the axle.

2. The combination with the rear axle of a vehicle and a transversely arranged rock shaft, supports, and operating means therefor, of a pair of brake arms at the ends of said shaft, heads on said arms disposed normally in the horizontal plane of the axle, and shoes on said heads having oppositely disposed friction surfaces, whereby the shoes may selectively be applied to wheels above or below the horizontal plane of the axle.

In testimony whereof I affix my signature.

DEARK J. BOATSMAN.